(12) United States Patent
Schiraldi et al.

(10) Patent No.: US 6,309,719 B1
(45) Date of Patent: Oct. 30, 2001

(54) AMORPHOUS COPOLYESTER RESIN COMPOSITION

(75) Inventors: David Anthony Schiraldi, Charlotte, NC (US); Daniel Martin Connor, Inman, SC (US)

(73) Assignee: Arteva North America S.A.R.L., Zurich (CH)

( * ) Notice: Subject to any disclaimer, the term of this patent is extended or adjusted under 35 U.S.C. 154(b) by 0 days.

(21) Appl. No.: 09/564,831

(22) Filed: May 4, 2000

(51) Int. Cl.[7] .............................. B29D 22/00; C08G 63/18
(52) U.S. Cl. .................... 428/35.7; 528/298; 528/302; 528/308; 528/308.6; 428/36.92; 428/364
(58) Field of Search ..................... 528/298, 302, 528/308, 308.6; 428/35.7, 36.92, 364

(56) References Cited

U.S. PATENT DOCUMENTS

| 5,567,796 | 10/1996 | Nakatsukasa et al. | 528/272 |
|---|---|---|---|
| 5,571,620 | 11/1996 | George et al. | 428/375 |
| 5,646,237 | 7/1997 | George et al. | 528/295 |
| 5,709,940 | 1/1998 | George et al. | 428/364 |

FOREIGN PATENT DOCUMENTS

| 03-200830 | 9/1991 | (JP) . |
|---|---|---|
| 05-005026 | 1/1993 | (JP) . |
| 05-097960 | 4/1993 | (JP) . |
| 05-117326 | 5/1993 | (JP) . |
| 05-155963 | 6/1993 | (JP) . |
| 05-155964 | 6/1993 | (JP) . |
| 07-048443 | 2/1995 | (JP) . |
| 08-269856 | 10/1995 | (JP) . |
| 08-209451 | 8/1996 | (JP) . |
| 09-095820 | 4/1997 | (JP) . |
| 10-158935 | 6/1998 | (JP) . |

*Primary Examiner*—Samuel A. Acquah
(74) *Attorney, Agent, or Firm*—Gregory N. Clements

(57) ABSTRACT

Copolyesters comprising monomeric units derived from norbornane compounds such as 2,3-norbornane dicarboxylic acid anhydride or dicarboxylate exhibit amorphous characteristics. Exemplary copolymers are obtained by polycondensation of ethylene glycol, terephthalic acid, and up to about 40 mole % cis-norbornane-endo-2,3-dicarboxylic acid anhydride or dimethyl trans-norbornane 2,3-dicarboxylate or mixtures thereof, based upon the total moles of ester forming components of the polyester. The copolymers containing monomeric units derived from norbornane dicarboxylic acid or dicarboxylate can be obtained by melt polymerization and exhibit no or very low crystallinity. The copolyesters may be used to produce transparent, optically clear amorphous articles of manufacture such as containers, extruded objects, and packaging by melt processing techniques such as injection molding, blow molding, extrusion or thermoforming.

42 Claims, No Drawings

AMORPHOUS COPOLYESTER RESIN COMPOSITION

FIELD OF THE INVENTION

The invention relates to amorphous copolyester resins comprising up to about 20 mole % of monomeric units derived from norbornane compounds, based upon the total moles of ester-forming components (or up to about 40% based upon either the dicarboxyl or diol residues of the polyester). The invention also relates to non-fibrous articles of manufacture, such as containers, bottles, or molded/extruded objects made from amorphous copolyesters comprising up to 20 mole % of monomeric units derived from norbornane compounds, based upon the total moles of ester-forming components.

BACKGROUND OF THE INVENTION

Crystalline polyethylene terephthalate (PET) is widely used for production of is various light weight molded or extruded articles due to excellent mechanical properties of the crystalline PET. However, in some applications, amorphous polyesters are desirable over crystalline polyesters due to their enhanced optical clarity, impact resistance and ease of injection molding. Amorphous copolyesters are widely used for packaging and display materials, printing substrates, etc.

Various proposals to modify PET polyester to reduce or eliminate its crytallinity have been disclosed in the art. To slow down the crystallization and eliminate crystallinity the crystalline structure of a polymer needs to be disrupted with an impurity. Comonomers that do not fit within a crystalline unit cell of a crystallizing polymer may serve as such impurity and successfully disrupt the crystalline structure. Disruption of the crystalline structure results in inhibition of crystallization rate and/or a decrease of the degree of crystallinity. However, the amount of the impurity or disruptive comonomer that needs to be incorporated into PET to completely eliminate crystallinity is quite high, which results in substantial alteration of the PET original mechanical and thermal properties.

The most common amorphous polyester based on polyethylene terephthalate is a PET copolymer modified by about 35 mole % of cyclohexanedimethanol (CHDM) comonomers. These polymers are commercially available from, for example, Eastman Chemical Company under various trade names such as PETG. The CHDM used for modification of PET in such copolymers usually consists of approximately 30/70 cis/trans monomers that is routinely obtained by catalytic hydrogenation of dimethyl terephthalate. However, the cost of CHDM monomers is high, which drives up the cost of PETG copolymers.

Japanese Patent Publication JP 05-005026 (published January 1993) discloses polyesters consisting of saturated norbornane monomeric units. While the polyester offers excellent heat resistance and transparency, the polyester disclosed in the reference is expensive.

Japanese Patent Publication JP 09-095820 (published April 1997) discloses high shrinkage fibers comprising copolyesters of ethylene glycol, terephthalic acid and tricyclodecane dimethanol. The copolymers, however, are semicrystalline with high melting enthalpy.

Japanese Patent Publications JP 05-155963 (published June 1993) and JP 05-155964 (published June 1993) disclose low molecular weight copolyester oligomers obtained from aliphatic diols, adipic acid and one or more norbornane dicarboxylic acids. The oligomers are polymerized with polyisocyanate to obtain polyurethanes.

Japanese Patent Publication JP 5-097960 (published April 1993) discloses polyurethanes based on polyols comprising norbornane derived monomers, such as monomeric units derived from norbornane-2,3-dimethanol.

Japanese Patent Publication JP 3-200830 (published September 1991) discloses polyesters and polyester-carbonates comprising a skeleton of norbornane, perhydrodimethanonapthalene and perhydrotrimethanoanthracene.

Japanese Patent Publications JP 8-269856 (published October 1995), JP 10-158935 (published June 1998) and JP 8-209451 (published August 1996) disclose composite fibers comprising a semicrystalline polyester based on PET or PBT and copolymerized with monomeric units having norbornane skeletons and a second polyester.

Japanese Patent Publication JP 07-048443 (published February 1995) discloses shrinkable films comprising polyesters derived from terephthalic acid, ethylene glycol and norbornane diol.

Japanese Patent Publication JP 05-117326 (published May 1993) discloses photocurable oligomers obtained from acrylic acid, 1,6 hexanediol and norbornane-2,3-dicarboxylic acid.

U.S. Pat. Nos. 5,571,620, 5,646,237, and 5,709,940 to George et al disclose sulfocopolyesters obtained by reacting difunctional sulfomonomers with ethylene glycol, polyethylene glycol and a $C_4$–$C_{12}$ dicarboxylic acid, including 2,5-norbornane dicarboxylic acid.

U.S. Pat. No. 5,567,796 to Nakatsukasa et al discloses polyester fiber obtained from a polyester comprising up to 20% based on dicarboxylic compounds of a norbornane compound. The reference teaches desirability of crystallinity in the polyesters and discloses polyesters comprising monomer units derived from a cis-norbornane-endo-2,3-dicarboxylic compound.

The present invention provides low cost amorphous polyethylene terephthalate based polyesters that contain monomeric units derived from ester forming saturated norbornane compounds. Incorporation of up to about 20 mole % of such units, based upon the total moles of ester-forming components, (or up to about 40 mole % based upon either dicarboxyl or diol residues) results in a polyester that exhibits a desirable, substantially non-crystalline behavior after normal melt-processing to provide an enhanced optical clarity, impact resistance and ease of injection molding.

SUMMARY OF THE INVENTION

The present invention provides an amorphous copolyester resin composition having up to about 20 mole % of the monomeric unit residues derived from norbornane compounds, such as at least one member selected from the group consisting of norbornane dicarboxylic acids, norbornane dicarboxylates, norbornane dicarboxylic anhydrides, and norbornane diols, for example norbornane-2,3-dicarboxylic acids, norbornane-2,3-dicarboxylic anhydride, norbornane-2,3-dicarboxylic esters, and mixtures thereof, based upon the total amount of ester-forming components. The norbornane compounds may be of the formula (I)

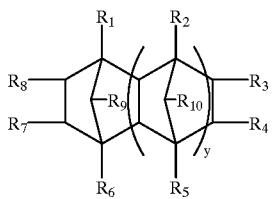

(I)

wherein y is an integer from 0 to 2, $R_1$, $R_2$, $R_5$–$R_{10}$ may be the same or different and are selected from hydrogen, or alkyl groups having 1–10 carbon atoms, and $R_3$ and $R_4$ can be the same or different and are selected from ester forming functional groups such as hydroxyl, carboxylic acid groups, a carboxylic anhydride group, or carboxylic ester groups.

The polyesters of the present invention may exhibit a melting enthalpy of less than about 2 J/g as measured by differential scanning calorimetry (DSC) using a 5 milligram sample, conducted at a heating or cooling rate of 10° C./min. In the most preferred embodiments of the present invention, the copolyesters of the present invention exhibit no measurable melting enthalpy as measured by DSC at a heating rate of 10° C./min.

The norbornane compounds may be cis-isomers, trans-isomers or mixture thereof. The copolymers may be obtained by copolymerizing monomeric units derived from norbornane compounds with conventional ester forming monomers. Copolymers containing up to about 20 mole % based upon the total moles of ester forming components, (or up to about 40 mole % of the dicarboxyl or diol residues) of units or residues derived from di- or polyfunctional ester forming norbornane compounds exhibit no crystalline melting point as measured by differential scanning calorimetry after melt processing.

DETAILED DESCRIPTION OF THE INVENTION

The present invention provides amorphous polyester copolymers based on polyethylene terephthalate (PET) that exhibit no melting point after being melt processed by conventional processing techniques such as extrusion, blow molding, stretch-blow molding, thermoforming, injection molding or calendering. They may be employed for the production of containers, such as bottles, or packaging and molded/extruded objects having a high degree of optical clarity and excellent mechanical properties. The polyesters of the present invention comprise, as monomeric units, residues of ester forming saturated norbornane compounds represented by the formula (I):

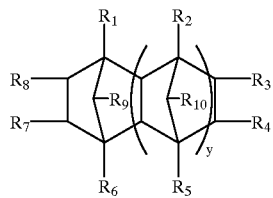

wherein y is an integer from 0 to 2, $R_1$, $R_2$, $R_5$–$R_{10}$ may be the same or different and are selected from hydrogen, or alkyl groups having 1–10 carbon atoms, or, and $R_3$ and $R_4$ can be the same or different and are selected from ester forming functional groups such as hydroxyl, carboxylic acid groups, a carboxylic anhydride group, or carboxylic ester groups. Other ester forming derivatives of saturated norbornane compounds are within the scope of the present invention.

In the preferred embodiments y is equal to 0, $R_1$, $R_6$–$R_9$ are all hydrogens and $R_3$ and $R_4$ are carboxylic acid groups, a carboxylic anhydride group, or carboxylate ester forming groups. Among the preferred norbornane compounds cis-norbornane-endo-2,3-dicarboxylic anhydride or dimethyl trans-norbornane-2,3-dicarboxylate are particularly preferred. The norbornane compounds employed in the present invention may, as indicated by the formula, have other substituent groups ($R_1$, $R_2$, $R_5$–$R_{10}$) in addition to the functional groups ($R_3$ and $R_4$) involved in the esterification reaction. However, the additional groups ($R_1$, $R_2$, $R_5$–$R_{10}$) should be selected from groups that will not or only minimally interfere with the reactions involved in formation of ester linkages during the polymerization process.

Saturated norbornane compounds of the present invention may be obtained by hydrogenation of respective unsaturated norbornane compounds. For example, cis-norbornane-endo-2,3,-dicarboxylic anhydrides may be obtained by catalytic hydrogenation of a corresponding cis-norbornene-endo-2,3-dicarboxylic anhydride, and trans-norbornane-2,3-dicarboxylates may be obtained by catalytic hydrogenation of the respective unsaturated trans-norbornene-2,3-dicarboxylate.

The polyesters of the present invention may exhibit a melting enthalpy of less than about 2 J/g as measured by differential scanning calorimetry (DSC) using a 5 milligram sample, conducted at a rate of 10° C./min. To prevent any aberrant heat history present in the polyester from skewing the melting enthalpy, testing for each sample should be conducted twice and the polyesters of the present invention exhibit a melting enthalpy of less than about 2 J/g on the second heating by DSC. In the most preferred embodiments of the present invention, the copolyesters of the present invention exhibit no measurable melting enthalpy as measured by DSC at a heating or cooling rate of 10° C./min. The most preferred copolyesters of the present invention are amorphous copolyesters exhibiting no melting peak as measured by DSC upon heating at a rate of 10° C./min.

The co-polyesters of the invention may be based on conventional polyesters formed from a dicarboxylic acid and an alkylene glycol and comprise as a third component, monomeric units derived from at least one norbornane compound of formula I disclosed above. The dicarboxylic acid may be an aliphatic or aromatic dicarboxylic acid such as adipic acid, succinic acid, phthalic acids, naphthalene dicarboxylic acid, and mixtures thereof. Preferred acids are aromatic phthalic acids with terephthalic acid being the most preferred acid. Among alkylene glycols, ethylene glycol, trimethylene glycol or tetramethylene glycol or their mixtures are the preferred alkylene glycols, and ethylene glycol is the most preferred glycol. The polyester of the invention may comprise additional co-monomers selected from various saturated or unsaturated dicarboxylic acids or glycols comprising various functional groups if such functional groups or unsaturation is desired for modification of the polyester properties.

In embodiments of the present invention, the third component, or monomeric units derived from at least one norbornane compound of formula (I) may be present in the co-polyesters in amounts up to about 20 mole % based on the total moles of monomers in the co-polyester, or up to about 40 mole % based on the total moles of either the dicarboxylic acid component or glycol component depending on the ester forming functional groups of the norbornane compound. The amount of the norbornane residue in the copolyester should be chosen to effectively reduce the degree of crystallinity or significantly inhibit the rate of crystallization so that the resulting copolymer is essentially or completely amorphous. In preferred embodiments, when the norbornane compounds are selected from dicarboxylic acids, diesters or mixtures thereof, the amounts of monomer units derived from norbornane compounds, or norbornane residues, may be from about 14 mole % to about 30 mole % based on the total amount of the diacid components in the polyester (from about 7 mole % to about 15 mole % based upon the total moles of ester forming components). More preferably the amount of monomer units derived from norbornane compounds, or norbornane residues, may be from about 15 mole % to about 25 mole % based on the total amount of all diacid components in the polyester (from about 7.5 mole % to about 12.5 mole % based upon the total moles of ester forming components).

If the amount of the monomer units derived from norbornane components is less than about 14 mole % based on the amount of the acid components, or less than about 7 mole % based on the total amount of monomers in the polyester, the crystallinity of the polyester does not decrease to a sufficient extent, or is not sufficiently inhibited, so that the polymer does not crystallize for essentially the lifetime of the product produced from melt processed copolyester. Generally, in embodiments of the present invention, the amount of the monomer units derived from norbornane components may, for example, be at least about 7 mole %, based upon the total moles of ester forming components or at least about 14 mole %, based on the dicarboxylic or diol residues of the copolyester (e.g. at least about 14 mole %, based upon the total moles of the dicarboxylic acid component). If more than about 40 % of the dicarboxylic acid components are derived from the norbornane compounds, mechanical and thermal properties of the polyesters tend to decay significantly. Generally, in embodiments of the present invention, the amount of the monomer units derived from norbornane components may, for example, be up to about 13 mole %, based upon the total moles of ester forming components, of the polyester, or up to about 26 mole % of either dicarboxylic or diol residues of the polyester (e.g. up to about 26 mole %, based upon the total moles of the dicarboxylic acid component).

Addition of either trans- or cis-norbornane compounds will have an effect on the final crystallinity of the copolyester. However, the reduction of crystallinity, or inhibition of the crystallization rate differs depending on the norbornane conformation for the same molar amount of the norbornane compound added to the copolyester. The trans- and cis- compounds have different configurations and incorporation of one of the two conformationally different norbornane compounds in the polyester molecular chain will result in greater or lesser disruption of the crystalline structure of the original polyester. The overall suppression of crystallinity, therefore, will vary depending on the configuration of the norbornane compound. For example, incorporation of a trans-2,3-norbornane compound decreases the degree of crystallinity of a crystalline polyester to an unexpectedly greater extent compared to the decrease in crystallinity caused by incorporation of a cis-2,3-norbornane compound in the crystalline copolyester in the same molar amount. In embodiments of the invention, both cis and trans-norbornane compounds may be incorporated into the polyester.

The polyesters of the present invention may be obtained by methods known in the art for preparation of polyesters by polycondensing monomeric mixtures containing, in addition to at least one dicarboxylic acid and at least one glycol, a predetermined amount of one or more saturated norbornane compounds.

The polyesters of the present invention may have an intrinsic viscosity, as measured in o-chlorophenol at 25° C., from about 0.35 dL/g to about 1 dL/g.

The polyester of the present invention may be used alone or in blends with other polymers and may incorporate one or more conventional additives such as antioxidants, UV stabilizers, plasticizers, pigments, and inorganic fillers, depending on the end use and processing conditions of the polyesters.

The copolyesters of the present invention can be used to obtain various articles of manufacture such as films, containers, such as plastic bottles for soft drinks, beer, and the like, container or bottle preforms, packaging, printing substrates, injection molded or extruded objects and other non-fibrous articles. The copolyesters may be processed to obtain desired articles of manufacture by conventional melt processing techniques used for melt processing of polyesters such as PET. The techniques include extrusion, thermoforming, injection molding, blow molding, stretch-blow molding, and other techniques known in the art. The articles obtained from the copolyesters of the invention remain substantially amorphous after being cooled to temperatures suitable or normal for utilization of a given article, such as room temperature, for essentially the lifetime of the article. By remaining amorphous during the lifetime, the articles retain optical clarity and impact properties characteristic to amorphous materials.

The invention is further illustrated by the following examples where the amounts of all components are given in grams, all temperatures are in ° C., and all pressures are atmospheric unless otherwise indicated. The properties and characteristics of the low molecular weight compounds and polymeric materials were determined according to the following procedures:

Nuclear Magnetic Resonance (NMR) spectra were obtained on a Bruker DMX—500 MHZ spectrometer. Samples were dissolved in $CDCl_3$.

Infrared spectra were obtained on a Nicolet 520 FTIR spectrometer.

Melting points were determined using a Thomas-Hoover melting point apparatus.

Differential scanning calorimetry (DSC) was performed using a Perkin-Elmer Series 7 differential scanning calorimeter operating under nitrogen and equipped with Intercooler 2. Samples (5 milligram) were analyzed for glass transition temperature, $T_g$, melting temperature, $T_m$, and crystallization temperature, $T_c$, by heating and cooling the samples between 40° C. and 294° C. at heating and cooling rates of 10° C./min. On each scan the samples were held at the 294 ° C. temperature for 10 minutes to remove thermal history.

Annealing was performed by holding the samples at 150° C. for 2 hours or 60 hours in a constant temperature oven.

Relative Visocosity (RV) was measured using a 1 gram sample of polyester dissolved in dichloroacetic acid to make a 1% solution at 25° C.

EXAMPLE 1

Preparation of cis-norbornane-endo-2,3-dicarboxylic anhydride (compound I)

A solution of cis-norbornene-endo-2,3-dicarboxylic anhydride (25.0 g, 152 mmol) in THF (tetrahydrofaran) (300 ml)

was hydrogenated at 40–45 psi in the presence of palladium on carbon for 1 hour. The mixture was filtered through a fine fritted glass filter and the solvent was removed under reduced pressure to give cis-norbornane-endo-2,3-dicarboxylic anhydride. The product was analyzed with $^1$H NMR (500 MHZ, CDCl$_3$); and IR NaCl) to confirm that the resulting product is the desired product.

EXAMPLE 2

Preparation of dimethyl trans-norbornane-2,3-dicarboxylate (compound II)

Freshly distilled cyclopentadiene (170 ml, 2.06 mol) was added to a solution of dimethyl fumarate (160.0 g, 1.110 mol) in benzene (850 mL). The solution was heated to reflux to dissolve the dimethyl fumarate and then stirred at room temperature overnight. The benzene was removed under reduced pressure leaving a clear liquid. A solution of 25 mL of the crude product in 300 mL THF was hydrogenated at 40–45 psi in the presence of palladium on carbon catalyst (1.5 g of 10 % Pd/C) for 1 hour. The mixture was filtered through a fine fritted glass filter, and the solvent was removed under reduced pressure to give dimethyl trans-norbornane-2,3-dicarboxylate. The product was analyzed with $^1$H NMR (500 MHZ, CDCl$_3$); and IR (NaCl) to confirm that the resulting product is the desired product.

EXAMPLE 3

Preparation of copolymers of cis-norbornane, ethylene glycol and dimethyl terephthalate Copolymers were obtained by melt polymerization in a 316 stainless steel reactor vessel equipped with a mechanical stiffer, distillation head and condenser. 156 g of dimethyl terephthalate (DMT), 140 g of ethylene glycol (EQ), 41.4 g of cis-norbornane-endo-2,3-dicarboxylic anhydride compound I (cis-NB), 0.142 g Mn(OAc)$_2$ and 0.73 g Sb$_2$O$_3$ were added to the reactor vessel, heated to 180–210° C., and kept at this temperature for 2 hours, during which methanol was filtered off by distillation. 0.83 gram of polyphosphoric acid (PPA) (10 % w/v in ethylene glycol) was then added to deactivate the manganese ester interchange catalyst, and the reaction pressure was slowly reduced to less than 1 Torr over 40 minutes. The molar amount of compound I employed was 25 mole %, based upon the total moles of dicarboxylic compounds (DMT and cis-NB). The reaction mixture was then heated to 285–290° C. to remove ethylene glycol by distillation. The polymer was extruded from the reaction vessel under nitrogen pressure and quenched in room temperature water.

To determine crystallinity, a 5 milligram sample of the polymer was subjected to differential scanning calorimetry (DSC) using two heating and cooling cycles at a heating/cooling rate of 10° C./min. in the temperature range between 40° C. and 294° C.

EXAMPLES 4 AND 5

Copolymers of EG, DMT and Compound II

The procedure of Example 3 was followed in Examples 4 and 5 except that: (1) instead of compound I, compound II was used as a comonomer in amounts of 15 mole % and 25 mole %, respectively, based upon the total moles of dicarboxylic components, and (2) the Mn(OAc)$_2$ and Sb$_2$O$_3$ catalysts were replaced with the catalyst Ti(OBu)$_4$ (TBT).

The amount of each component employed, the relative viscosity of the polymer and the crystallinity of the extruded, quenched polymer are presented in Table 1. The DSC data for the extruded, quenched polymer is presented in Table 2.

EXAMPLE 6

Terpolymers of EG, DMT, Compound I and Compound II

The procedure of Example 3 was followed in Example 6 except the amounts of components were changed to obtain a polyester with 12.5 mole % of compound I and 12.5 mole % of compound II, based upon the total moles of dicarboxylic components. The amount of each component employed, the relative viscosity of the polymer and the crystallinity of the extruded, quenched polymer are presented in Table 1.

COMPARATIVE EXAMPLES 1 AND 2

Copolymers of EG, DMT and CHDM

The procedure of Example 3 was followed in Comparative Examples 1 and 2 except the amounts of components were changed to obtain a polyester with 25 mole % and 35 mole % of CHDM, respectively, based upon the total moles of dicarboxylic components. The amount of each component, the relative viscosity of the polymer and the crystallinity of the extruded, quenched polymer are presented in Table 1. The DSC data for the extruded, quenched polymer is presented in Table 2.

COMPARATIVE EXAMPLES 3 and 4

Copolymers of EG, DMT and Compound I

The procedure of Example 3 was followed in Comparative Examples 3 and 4 except that the amounts of components were changed to obtain polyesters with 5 mole % and 15 mole %, respectively of compound I. The amount of each component employed, the relative viscosity of the polymer and the crystallinity of the extruded, quenched polymer are presented in Table 1. The DSC data for the extruded, quenched polymer is presented in Table 2.

COMPARATIVE EXAMPLE 5

Terpolymer of EG, DMT, Compound I and Compound II

The procedure of Examples 4 and 5 was followed except the amounts of components were changed to obtain a polyester with 6 mole % of compound I and 9 mole % of compound II. The amount of each component employed, the relative viscosity of the polymer and the crystallinity of the extruded, quenched polymer are presented in Table 1. The DSC data for the extruded, quenched polymer is presented in Table 2:

TABLE 1

Polyester Component Amounts, Relative Viscosity, and Crystallinity

| Example | Mol % | DMT | EG | CHDM | Cis-NB | Trans-NB | Mn(OAc)$_2$ | Sb$_2$O$_3$ | TBT | PPA | Rel. Visc | A/S* |
|---|---|---|---|---|---|---|---|---|---|---|---|---|
| 3 | 25 cis-NB | 156 | 140 | — | 41.4 | — | 0.142 | 0.73 | — | 0.86 | 1.876 | A |
| 4 | 15 trans-NB | 206 | 175 | — | — | 39.8 | — | — | 0.30 | — | 1.844 | S |
| 5 | 25 trans-NB | 182 | 175 | — | — | 66.3 | — | — | 0.30 | — | 1.842 | A |
| 6 | 12.5 cis-NB 12.5 trans-NB | 182 | 175 | — | 25 | 31.8 | 0.179 | 0.91 | — | 1.08 | 1.792 | A |
| Comp. 1 | 25 CHDM | 777 | 497 | 144 | — | — | 0.423 | 0.289 | — | 2.58 | 1.789 | A |
| Comp. 2 | 35 CHDM | 777 | 472 | 202 | — | — | 0.423 | 0.289 | — | 2.58 | 1.730 | A |
| Comp. 3 | 5 cis-NB | 738 | 558 | — | 42.4 | — | 0.282 | 0.275 | — | 1.72 | 1.815 | S |
| Comp. 4 | 15 cis-NB | 660 | 558 | — | 99.7 | — | 0.282 | 0.246 | — | 1.72 | 1.837 | S |
| Comp. 5 | 6 cis-NB 9 trans-NB | 206 | 175 | — | 12.5 | 23.9 | — | — | 0.30 | — | 1.828 | S |

*A = Amorphous, S = Semicrystalline, as produced, extruded, and quenched.
Amounts of all components are given in grams, unless otherwise indicated.
Mole % of the norbornane (NB) component is based upon the total moles of dicarboxylic components.

TABLE 2

Polyester Crystallinity As Measured By Differential Scanning Calorimetry

| Example | Tg 1st heating (° C.) | Crystall. peak, 1st heating | Melting peak 1st heating (J/g) | Crystall. peak, 2nd cooling (° C.) | Tg 2nd heating (° C.) | Crystall. peak, 2nd heating | Melting peak 2nd heating (J/g) |
|---|---|---|---|---|---|---|---|
| 3 25% cis-NB | nm* | — | — | — | 64.6 | — | — |
| 4 15% trans-NB | 64.8 | — | 218.1° C. 6.8 J/g | — | 68.6 | — | 218.1° C. 0.53 J/g |
| 5 25% trans-NB | 58.3 | — | — | — | 61.8 | — | — |
| Comp. 1 25% CHDM | 76.6 | — | — | — | 78.8 | — | — |
| Comp. 2 35% CHDM | 80.0 | — | — | — | 79.6 | — | — |
| Comp. 3 5% cis-NB | 75.2 | 152.6° C. −26.1 J/g | 241.4° C. 28.5 J/g | 170.2° C. −21.2 J/g | 76.4 | 163.8° C. −3.7 J/g | 240.3° C. 26.7 J/g |
| Comp. 4 15% cis-NB | 68.7 | 154.6° C. −20.9 J/g | 221.7° C. 18.9 J/g | 137.9° C. −3.8 J/g | 71.6 | 155.3° C. −8.5 J/g | 219.2° C. 15.8 J/g |
| Comp. 5 6% cis, 9% trans-NB | 60.8 | 168.6° C. −8.3 J/g | 212.7° C. 7.2 J/g | — | 67.8 | 170.0° C. −3.8 J/g | 213.0° C. 3.4 J/g |

As can be seen from the results shown in Tables 1 and 2, copolymers containing 25 mole % monomeric units derived from either a cis- or trans-norbornane compound (Examples 3 and 5), and copolymers containing 25 and 35 mole % CHDM monomeric units (Comparative Examples 1 and 2) exhibit completely amorphous behavior. The copolymers containing 5 mole % and 15 mole % of cis-norbornane units (Comparative Examples 3 and 4) are semicrystalline with a melting enthalpy of 26.7 J/g and 15.8 J/g, respectively. However, while the copolymer containing 15 mole % of trans-norbornane units (Example 4) has a much lower degree of crystallinity and has a melting enthalpy of only 0.53 J/g. The copolymer containing 6 mole % of cis-norbornane units and 9 mole % trans-norbornane units (Comparative Example 5) had a higher degree of crystallinity and higher enthalpy of melting (3.4 J/g) than exhibited by the copolymer having 15 mole % of trans-norbornane units (Example 4).

EXAMPLE 10

Effect of Annealing on Crystallinity of Amorphous Polyesters

The copolyesters that exhibited completely amorphous behavior, i.e. copolymers containing 25 mole % of monomer units derived from cis-norbornane-endo-2,3-dicarboxylic anhydride (Example 3); copolymers containing 25 mole % of monomeric units derived from trans-norbornane-2,3-dicarboxylate (Example 5); and copolymers containing 25 and 35 mole % of monomeric units derived from CHDM (Comparative Examples 1 and 2) were annealed at 150° C. for two hours and then subjected to two heating/cooling cycles in a DSC at a heating/cooling rate of 10° C./min in the temperature range between 40° C. and 294° C. All samples were partially crystalline. The results are shown in Table 3:

TABLE 3

Effect of 2 Hour Annealing on Crystallinity of Amorphous Polyesters

| Example | Tg 1st heating (° C.) | Melting peak 1st heating (J/g) | Tg 2nd heating (J/g) |
|---|---|---|---|
| 3 25% cis-NB | 60.2 | 20.1 J/g Tm = 188° C. | 64.6 |
| 5 25% trans-NB | 58.1 | 17.3 J/g Tm = 184° C. | 62.4 |
| Comp. 1 | 80.9 | 25.2 J/g | — |

TABLE 3-continued

Effect of 2 Hour Annealing on Crystallinity of Amorphous Polyesters

| Example | Tg 1st heating (° C.) | Melting peak 1st heating (J/g) | Tg 2nd heating (J/g) |
|---|---|---|---|
| 25% CHDM Comp. 2 35% CHDM | 75.2 | Tm = 196° C. 2.2 J/g Tm = 185° C. | 77.8 |

The same four copolymers (the polyesters of Examples 3 and 5 and Comparative Examples 1 and 2) were annealed for 60 hours at 150° C. and subjected to two heating/cooling cycles in a DSC at a heating/cooling rate of 10° C./min in the temperature range between 40° C. and 294° C. All samples were partially crystalline. The enthalpies of melting after 60 hours of annealing for the polyesters of Examples 3 and 5, and Comparative Examples 1 and 2 were 25.2 J/g (25% cis-NB), 21.8 J/g (25% trans-NB), 31.1 J/g (25% CHDM) and 23.1 J/g (35% CHDM), respectively, as shown in Table 4:

TABLE 4

Effect of 60 Hour Annealing on Crystallinity of Amorphous Polyesters

| Example | Melting peak 1st heating (J/g) |
|---|---|
| 3 25% cis-NB | 25.2 J/g Tm = 189° C. |
| 5 25% trans-NB | 21.8 J/g Tm = 165° C. |
| Comp. 1 25% CHDM | 31.1 J/g Tm = 166° C. |
| Comp. 2 35% CHDM | 23.1 J/g Tm = 169° C. |

As can be seen from the results shown in Tables 3 and 4, the copolymers containing either cis- or trans-norbornane units exhibit a lesser degree of crystallinity compared to copolymers containing the same amount of monomer units derived from CHDM under tempering conditions which are highly favorable for crystallization. For example, as shown in Table 3, melting enthalpies of 20.1 J/g, 17.3 J/g and 25.2 J/g were obtained in Examples 3, 5, and Comparative Example 1, respectively. In Comparative Example 2, a lower degree of crystallinity was observed but the amount of CHDM was substantially higher (35 mole %). As shown in Table 4, after 60 hours of tempering the 25 mole % trans-NB copolymer (Example 5) had a lower degree of crystallinity (21.8 J/g) than that of the remaining polyesters, even compared to the 35 mole % CHDM polyester of Comparative Example 2.

Again, the degree of crystallinity for the annealed copolymers (2 hr. and 60 hr. annealing times) containing cis-norbornane units is greater than the degree of crystallinity of the annealed copolyesters containing trans-norbornane units, which is consistent, with the crystalline behavior of the non-annealed copolymers containing 15 mole % of cis- or trans-norbornane units as shown in Table 2. The results show that trans-norbornane units have an unexpectedly greater effect on lowering the degree of crystallinity or on inhibiting the crystallization rate in the polyesters.

Thus it is apparent that there has been provided, in accordance with the invention, a product and an article of manufacture that filly satisfies the object, aims and advantages set forth above. While the invention has been described in conjunction with specific embodiments thereof, it is evident that many alternatives, modifications and variations will be apparent to these skilled in the art in light of the foregoing description. Accordingly, it is intended to embrace all such alternatives, modifications and variations as fall within the spirit and scope of the invention.

What is claimed is:

1. An amorphous copolyester as determined by differential scanning calorimetry analysis comprising residues of at least one ester forming norbornane compound of formula (I)

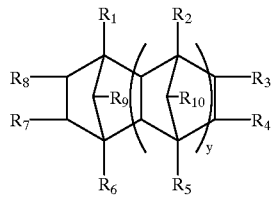

(I)

wherein
   y is an integer from 0 to 2,
   $R_1$, $R_2$, and $R_5$–$R_{10}$ are the same or different and are selected from the group consisting of hydrogen and alkyl groups having 1–10 carbon atoms, and
   $R_3$ and $R_4$ are the same or different and are ester forming functional groups, said residues being present in an amount which is at least about 7 mole % and up to about 13 mole %, based upon the total moles of ester forming components of the polyester, or at least about 14 mole % and up to about 26 mole % of either dicarboxylic or diol residues of the polyester, and said copolyester having a melting enthalpy of less than about 2 J/g, as measured by differential scanning calorinetty on second heating of a 5 mg sample at a rate of 10° C./minute.

2. A copolyester as claimed in claim 1, wherein said ester forming norbornane compound is at least one member selected from the group consisting of norbornane dicarboxylic acids, norbornane dicarboxylates, norbornane dicarboxylic anhydrides and norbornane diols.

3. A copolyester as claimed in claim 1, wherein y=0 and $R_1$, and $R_6$ through $R_9$ are all hydrogens.

4. A copolyester as claimed in claim 3, wherein said ester forming norbornane compound is selected from the group consisting of norbornane-2,3-dicarboxylic acids, norbornane-2,3-dicarboxylic anhydride, norbornane-2,3-dicarboxylic esters, and mixtures thereof.

5. A copolyester as claimed in claim 4, wherein said ester forming norbornane compound is selected from the group consisting of cis-norbornane-endo-2,3-dicarboxylic acid anhydride, trans-norbornane-2,3-dicarboxylic acid alkyl esters, and mixtures thereof.

6. A copolyester as claimed in claim 5, wherein the amount of said residues of the ester forming norbornane compound in said copolyester is from about 15 mole % to about 25 mole %, based on the total amount of dicarboxylic residues in the copolyester.

7. A copolyester as claimed in claim 5, wherein said ester forming norbornane compound is trans-norbornane-2,3-dimethyl carboxylate.

8. An amorphous copolyester, as determined by differential scanning-calorimetry analysis, comprising residues of at least one ester forming trans-norbornane compound in an amount from about 7 mole % up to about 20 mole %, based upon the total moles of ester-forming, components, wherein said ester forming-trans-norboraane compound has ester forming functional groups in the 2-position and 3-position of the norbornane compound, and said copolyester having a melting enthalpy of less than about 2 J/g as measured by differential scanning calorimetry on second heating of a 5 mg sample at a rate of 10° C./minute.

9. A copolyester as claimed in claim 8, wherein said ester forming trans-norbornane compound is selected from the group consisting of trans-norbornane-2,3-dicarboxylic acid, trans-norbornane-2,3-dicarboxylic acid alkyl ester, trans-norbornane-2,3-dicarboxylic acid anhydride, and mixtures thereof.

10. A non-fibrous article of manufacture obtained by melt processing, comprising a copolyester comprising from about 7 mole % up to about 20 mole % of residues of an ester forming norbornane compound, based upon the total moles of ester forming components, wherein said article is amorphous as determined by differential scanning calorimetry analysis.

11. An article of manufacture as claimed in claim 10 wherein the amount of said norbornane residues in said copolyester is from about 7 mole % to about 15 mole %, based upon the total moles of ester forming components.

12. An article of manufacture as claimed in claim 11, wherein said ester forming norbornane compound is at least one member selected from the group consisting of norbornane dicarboxylic acids, norbornane dicarboxylates, norbornane dicarboxylic anhydrides, and norbornane diols.

13. An article of manufacture as claimed in claim 12, wherein said ester forming norbornane compound is selected from the group consisting of norbornane-2,3-dicarboxylic acids, norbornane-2,3-dicarboxylic acid anhydride, norbornane-2,3-dicariboxylic esters, and mixtures thereof.

14. An article of manufacture as claimed in claim 13, wherein said ester forming norbornane compound is selected from the group consisting of cis-norbornane-endo-2,3-dicarboxylic acid anhydride, trans-norbornane-2,3-dicarboxylic acid alkyl esters, and mixtures thereof.

15. An article of manufacture as claimed in claim 14, wherein said ester forming norbornane compound is trans-norbornane-2,3-dimethyl carboxylate.

16. An article of manufacture as claimed in claim 13, wherein the amount of said residues of the ester forming norbornane compound in said copolyester is from about 15 mole % to about 25 mole %, based on the total amount of dicarboxylic residues in the copolyester.

17. An article of manufacture as claimed in claim 10, wherein said melt processing is selected from injection molding, blow molding, extrusion or thermoforming.

18. An article of manufacture as claimed in claim 10, wherein said article is amorphous at room temperature.

19. An article of manufacture as claimed in claim 10, wherein said article is a container.

20. An article of manufacture as claimed in claim 10, wherein said article is a bottle or a perform for a bottle.

21. A container comprising a polyester which has residues of an ester forming norbornane compound in an amount from about 7 mole % up to about 20 mole %, based upon the total moles of ester forming components.

22. A container as claimed in claim 21 wherein said container is produced by injection molding, blow molding, extrusion or thermoforming.

23. A container as claimed in claim 21 wherein said container is produced by injection molding or blow molding.

24. A container as clued in claim 21 which is a bottle.

25. A container as claimed in claim 21 wherein said ester-forming morbornane compound is represnted by the formula (I);

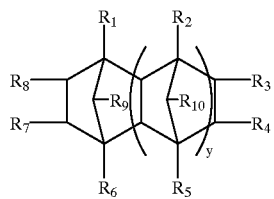

(I)

wherein y is an integer from 0 to 2, $R_1$, $R_2$, and $R_5$–$R_{10}$ are the same or different and are selected from the group consisting of hydrogen and alkyl groups having 1–10 carbon atoms, and $R_3$ and $R_4$ are the same or different and are ester forming functional groups.

26. A container as claimed in claim 25 wherein said polyester has a melting enthalpy of less than about 2 J/g, as measured by different scanning calorimetry using a 5 milligram sample and conducted at a rate of 10° C./minute.

27. A container as claimed in claim 25 wherein said polyester is completely amorphous as determined by differential scanning calorimetry using a 5 milligram sample and conducted at a rate of 10° C./minute.

28. A container of claim 25, wherein said copolyester has a melting enthalpy of less than 2 J/g as measured by differential scanning calorimetry on second heating of a 5 mg sample at a rate of 10° C./min.

29. An article of manufacture according to claim 10, wherein said copolyester has a melting enthalpy of less than about 2 J/g as measured by differential scanning calorimetry on second heating of a 5 mg sample at a rate of 10° C./min.

30. An amorphous copolyester as determined by differential scanning calorimetry analysis comprising residues of at least one ester forming norbornane compound of formula (I)

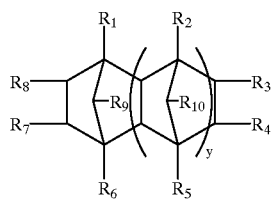

(I)

wherein
y is an integer from 0 to 2,
$R_1$, $R_2$, and $R_5$–$R_{10}$ are the same or different and are selected from the group consisting of hydrogen and alkyl groups having 1–10 carbon atoms, and
$R_3$ and $R_4$ are the same or different and are ester forming functional groups,
said residues being present in an amount which is at least about 7 mole % and up to about 13 mole %, based upon the total moles of ester forming components of the polyester, or at least about 14 mole % and up to about 26 mole % of either dicarboxylic or diol residues of the polyester, and said copolyester having a melting enthalpy of less than about 2 J/g as measured by differential scaming calorimetry using a 5 mg sample and conducted at a rate of 10° C./minute.

31. A copolyester according to claim 30 which has no measurable melting enthalpy as measured by differential scanning calorimetry using a 5 milligram sample at a heating rate of 10° C./minute.

32. A copolyester according to claim 30 wherein $R_3$ and $R_4$ are selected from the group consisting of hydroxyl, carboxylic acid groups, a carboxylic anhydride group and carboxylic ester groups.

33. A copolyester according to claim 1 wherein $R_3$ and $R_4$ are selected from the group consisting of hydroxyl, carboxylic acid groups, a carboxylic anhydride group and carboxylic ester groups.

34. A copolyester according to claim 3 wherein $R_3$ and $R_4$ are selected from the group consisting of carboxylic acid groups, a carboxylic anhydride group and carboxylate ester groups.

35. An article of manufacture according to claim 16 wherein the copolyester has a melting enthalpy of less than about 2 J/g as measured by differential scanning calorimetry using a 5 mg sample and conducted at a rate of 10° C./minute.

36. An article of manufacture according to claim 20, wherein the copolyester has no measurable melting enthalpy as measured by differential scanning calorimetry on a second heating at a heating rate of 10° C./minute.

37. A container according to claim 21, wherein the polyester has a melting enthalpy of less than about 2 J/g as measured by differential scanning calorimetry using a 5 mg sample and conducted at a rate of 10° C./minute.

38. An amorphous copolyester according to claim 8 wherein the trans-nobornane compound is a compound of formula (I)

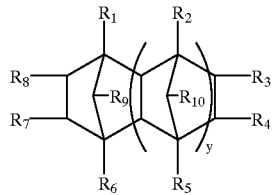

(I)

wherein
  y is an integer from 0 to 2,
  $R_1$, $R_2$, and $R_5$–$R_{10}$ are the same or different and are selected from the group consisting of hydrogen and alkyl groups having 1–10 carbon atoms, and
  $R_3$ and $R_4$ are the same or different and are ester forming functional groups.

39. A non-fibrous article of manufacture made from a copolyester as claimed in claim 1 by melt processing said copolyester.

40. An article of manufacture according to claim 39 which is a bottle or a bottle perform.

41. A non-fibrous article of manufacture made from a copolyester as claimed in claim 30 by melt processing said copolyester.

42. An article of manufacture according to claim 41 which is a bottle or a bottle perform.

* * * * *